United States Patent
Banik et al.

(10) Patent No.: US 12,529,123 B2
(45) Date of Patent: Jan. 20, 2026

(54) STEEL COMPONENT HAVING A METAL COATING PROTECTING IT AGAINST CORROSION

(71) Applicants: ThyssenKrupp Steel Europe AG, Duisburg (DE); thyssenkrupp AG, Essen (DE)

(72) Inventors: Janko Banik, Altena (DE); Maria Köyer, Dortmund (DE); Dirk Rosenstock, Essen (DE); Manuela Ruthenberg, Dortmund (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 0 days.

(21) Appl. No.: 18/210,816

(22) Filed: Jun. 16, 2023

(65) Prior Publication Data

US 2023/0332262 A1    Oct. 19, 2023

Related U.S. Application Data

(62) Division of application No. 16/647,894, filed as application No. PCT/EP2018/077692 on Oct. 11, 2018, now Pat. No. 11,739,393.

(30) Foreign Application Priority Data

Oct. 19, 2017   (DE) ............ 10 2017 218 704.2

(51) Int. Cl.
*C21D 9/48* (2006.01)
*B21D 22/02* (2006.01)
(Continued)

(52) U.S. Cl.
CPC ............ *C21D 9/48* (2013.01); *B21D 22/022* (2013.01); *C21D 6/002* (2013.01); *C21D 6/005* (2013.01);
(Continued)

(58) Field of Classification Search
CPC ...................................................... C23C 2/12
See application file for complete search history.

(56) References Cited

U.S. PATENT DOCUMENTS

| | | |
|---|---|---|
| 2012/0085467 A1 | 4/2012 | Thirion |
| 2014/0234657 A1 | 8/2014 | Azuma |

(Continued)

FOREIGN PATENT DOCUMENTS

| | | |
|---|---|---|
| CN | 101501235 | 8/2009 |
| CN | 106795575 | 5/2017 |

(Continued)

OTHER PUBLICATIONS

Liu, X. et al. "Recent development on theory and application of variable gauge rolling, a review." 2014. Acta Metall. Sim. 27. p. 483-493. (Year: 2014).*

(Continued)

*Primary Examiner* — Nicholas A Wang
(74) *Attorney, Agent, or Firm* — Rankin, Hill & Clark LLP

(57) ABSTRACT

The present invention relates to a method for producing a steel component comprising a substrate and a coating, to a corresponding sleet component and to the use thereof in the automotive sector.

17 Claims, 1 Drawing Sheet

Figure 1:
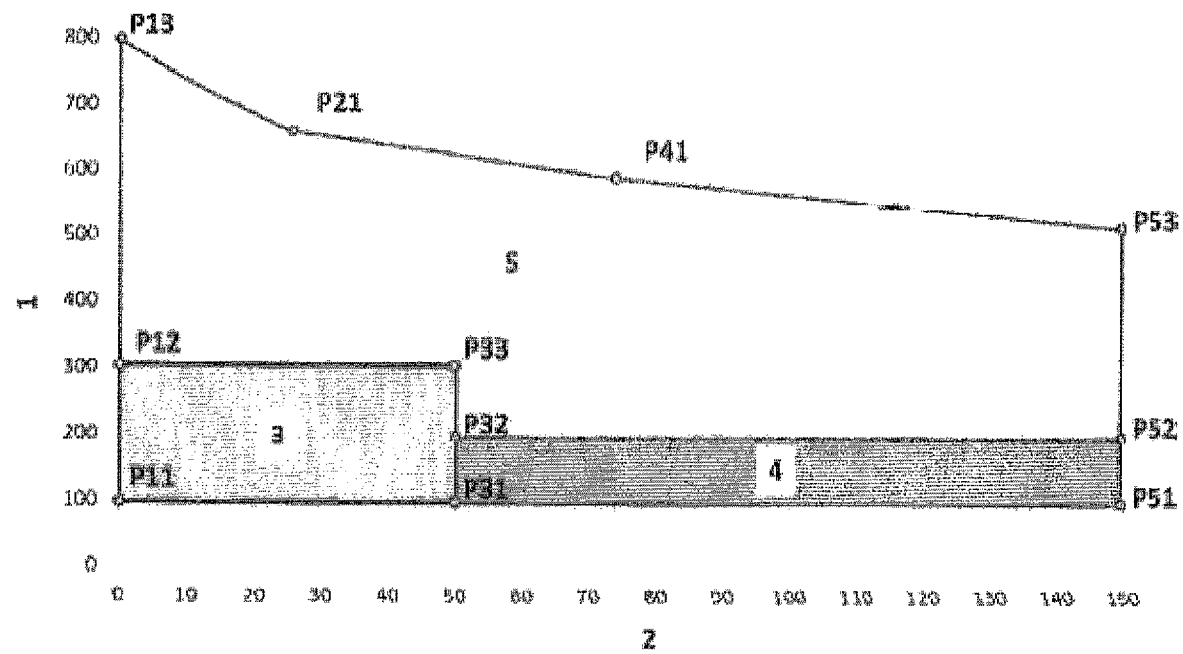

(51) Int. Cl.
   | | |
   |---|---|
   | *C21D 6/00* | (2006.01) |
   | *C21D 8/04* | (2006.01) |
   | *C22C 38/00* | (2006.01) |
   | *C22C 38/02* | (2006.01) |
   | *C22C 38/04* | (2006.01) |
   | *C22C 38/06* | (2006.01) |
   | *C22C 38/22* | (2006.01) |
   | *C22C 38/26* | (2006.01) |
   | *C22C 38/28* | (2006.01) |
   | *C22C 38/32* | (2006.01) |
   | *C23C 2/06* | (2006.01) |
   | *C23C 2/28* | (2006.01) |
   | *C23C 2/40* | (2006.01) |

(52) U.S. Cl.
   CPC ........... *C21D 6/008* (2013.01); *C21D 8/0405* (2013.01); *C21D 8/0426* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *C22C 38/32* (2013.01); *C23C 2/06* (2013.01); *C23C 2/28* (2013.01); *C23C 2/29* (2022.08); *C23C 2/40* (2013.01)

(56) References Cited

U.S. PATENT DOCUMENTS

| | | | |
|---|---|---|---|
| 2015/0024237 A1 | 1/2015 | Tanahashi | |
| 2015/0191813 A1* | 7/2015 | Maki | C22C 38/32 |
| | | | 148/531 |
| 2017/0218471 A1 | 8/2017 | Bongards | |
| 2017/0253941 A1* | 9/2017 | Cobo | C21D 9/46 |
| 2017/0260601 A1* | 9/2017 | Banik | C22C 21/06 |

FOREIGN PATENT DOCUMENTS

| | | | |
|---|---|---|---|
| CN | 107002213 | | 8/2017 |
| DE | 2993248 | * | 3/2016 |
| EP | 1767286 | | 3/2007 |
| EP | 2377965 | | 10/2011 |
| EP | 2695963 | | 2/2014 |
| EP | 2993248 | | 3/2016 |
| WO | 2015036151 | | 3/2015 |
| WO | WO2016016676 | * | 2/2016 |
| WO | 2018234102 | | 12/2018 |

OTHER PUBLICATIONS

"Temper Rolling". The Free Dictionary. 2011. Retrieved from: https://web.archive.org/web/20110811170328/https://encyclopedia2.thefreedictionary.com/Temper+Rolling (Year: 2011).*

C. Ramadeva Shastry, Corrosion of Metallic Coated Steels, Corrosion: Materials, vol. 13B, ASM Handbook, Edited By Stephen D. Cramer, Bernard S. Covino, Jr., ASM International, p. 35-39, https://doi.org/10.31399/asm.hb.v13b.a0003808 (Year: 2005).*

International Search Report filed in PCT/EP2018/077692 mailed Jun. 3, 2019.

International Preliminary Report on Patentability issued Apr. 21, 2020.

* cited by examiner

STEEL COMPONENT HAVING A METAL COATING PROTECTING IT AGAINST CORROSION

TECHNICAL FIELD

The present invention relates to a method for producing a steel component comprising a substrate and a coating, to a corresponding steel component, and to the use thereof in the automotive sector.

TECHNICAL BACKGROUND

In order to provide the combination of low weight, maximum strength and protective effect required in modern car body construction, nowadays components which are hot-formed from high-strength steels are used in the regions of the body which may be subject to particularly high loads in the event of a crash. In hot forming, also called hot stamping, steel blanks which were previously separated from a cold-rolled or hot-rolled steel strip are heated to a forming temperature that is generally above the austenitizing temperature of the steel in question and are placed into the mold of a forming press in the heated state. Over the course of the subsequent forming, the sheet metal blank or the component formed therefrom undergoes rapid cooling due to the contact with the cool mold. The cooling rates are set such that a tempered microstructure results in the component.

WO 2015/036151 A1 discloses a method for producing a steel component provided with a metal, corrosion-protective coating and a corresponding steel component. The method according to this document comprises coating a flat steel product with an alloy of aluminum, zinc, magnesium and optionally silicon and iron, cutting a blank from the flat steel product, heating the blank and forming the blank to obtain the desired steel component.

DE 699 07 816 T2 discloses a method for producing a coated hot-rolled and cold-rolled steel sheet having very high strength after thermal treatment. For this purpose, a flat steel product is provided with a coating and is thermally treated. During the thermal treatment, the workpiece is heated to a temperature of over 750° C.

EP 2 993 248 A1 discloses a flat steel product having an aluminum-containing coating, which contains from 0.005 to 0.7 wt. % of at least one alkali and/or alkaline earth metal, and a method for its production.

In this method, the coated flat steel product is heated to a temperature of from 700 to 900° C. for 360 s, 600 s or 800 s and is then formed.

When heating the sheet metal blanks, consisting of a steel substrate and an aluminum-based, metal corrosion-protection coating, hydrogen diffuses into the steel substrate through the metal coating due to the surface reaction of the moisture present in the furnace with the aluminum coating. After press-hardening, the hydrogen can no longer escape from the steel substrate since the metal coating is a barrier to the diffusible hydrogen $H_{diff}$ at room temperature. The content of $H_{diff}$ reduces the stresses which can be permanently borne by the steel, and spontaneous "hydrogen-induced" fractures can occur if tensile stresses are present in the sheet metal. In order to avoid cracks at the stresses that are usually present in the body-in-white construction, the content of diffusible hydrogen should be below a component-specific value. This value depends, inter aria, on the complexity of the hot-forming operation, the post-processing by, for example, laser cutting, punching, mechanical cutting or hot trimming and the installation situation and joining concept and thus the state of tension in the bodywork. The amount $H_{diff}$ remaining after processing should preferably be ≤0.4 ppm (parts per million) prior to critical body-in-white processes, depending on said processing.

Furthermore, there are manufacturing processes in which regions of coated steel strips are rolled to a lower sheet thickness than other regions and corresponding sheet metal blanks having different rolling degrees are then taken therefrom. As a result, weight-optimized and load-adapted components can be produced. The ratio of the decrease in thickness due to rolling to the starting thickness is referred to as the rolling degree. In this case, according to the invention, the rolling degree applies only to a rolling process in which the coating is already present on the substrate. The rolled regions having a lower sheet thickness compared with the sheet thickness existing prior to rolling have a significantly higher defect density in the steel substrate due to the rolling. As a result, diffusible hydrogen can accumulate to a greater degree in the rolled regions than in the non-rolled regions, such that, after the hot forming and the press hardening, there is a higher diffusible hydrogen content. As a result, hydrogen-induced cracking can occur much more rapidly after hot forming and press hardening in material that is rolled after coating. A known method for reducing the content of diffusible hydrogen in the component is to lower the dew point in the furnace by the steel sheet being heated before forming, in order to thus prevent the formation of diffusible hydrogen from the existing moisture in the furnace atmosphere during the oxidation of the substrate and as a result to lower the $H_{diff}$ absorption by the steel component. Lowering the dew point is, however, more complex the lower the dew point needs to be. It is therefore desirable to not influence the dew point as much as possible and, if required, to not lower it too much.

The problem addressed by the present invention is therefore to provide a method for producing steel components comprising a substrate and a coating by means of which corresponding steel components can be obtained which have the lowest possible $H_{diff}$ content in order to minimize the risk of hydrogen-induced cracking after hot forming and to minimize said risk in subsequent use. Furthermore, the problem addressed by the present invention is to provide a method by means of which it is possible not to exceed a certain $H_{diff}$ content in a hot-formed component by selecting different furnace parameters depending on the rolling degree and the sheet thickness of the flat steel product used.

This problem is solved by the method according to the invention for producing a steel component having a content of diffusible hydrogen $H_{diff}$ of up to 0.4 ppm, comprising at least the steps of:

(A) providing a flat steel product having a coating containing (all data in wt. %) 3 to 15 Si, 1 to 3.5 Fe, 0.05 to 5.0 alkali and/or alkaline earth metals, remainder Al and unavoidable impurities, which has a rolling degree to sheet thickness ratio (WGB) of 0.8 to 200, (B) determining a WOP value on the basis of the rolling degree to sheet thickness ratio WGB within a surface spanned by straight connecting paths between the points P11 (WGB 0.8, WOP 100) and P13 (WGB 0.8, WOP 800), P13 (WGB 0.8, WOP 800) and P21 (WGB 26, WOP 650), P21 (WGB 26, WOP 650) and P41. (WGB 74, WOP 590), P41 (WGB 74, WOP 590) and P53 (WGB 150, WOP 520), P53 (WGB 150, WOP 520) and P51 (WGB 150, WOP 100) and P51 (WGB 150, WOP 100) and P11 (WGB 0.8, WOP 100) in a coordinate system in which the WOP value is plotted on they axis and the rolling degree to sheet thickness ratio is plotted on the x axis, as preferably shown in FIG. 1, (C) treating the flat steel product at an average furnace temperature $T_{furnace}$ (in Kelvins (K)) for a duration $t_{furnace}$ (in hours (h)), wherein the dew point temperature of the furnace atmosphere of the furnace $T_{dew\ point}$ (in Kelvins (K)), the average furnace temperature $T_{furnace}$ (in K) and the duration $t_{furnace}$ (in h) are set according to the following equation of general formula (1)

$$WOP = \frac{T_{furnace}}{K} \cdot \log\left(\frac{t_{furnace}}{h} + 1.15\right) + \left(\frac{T_{dew\ point}}{K} - 243.15\right)^{1.6}, \quad (1)$$

and (D) forming the heated flat steel product from step (B) in a mold while being simultaneously cooled to obtain the steel component.

Furthermore, these problems are also solved by a corresponding steel component and by the use of the steel component according to the invention in the automotive sector, in particular as a bumper sup-port/reinforcement, door reinforcement, B-pillar reinforcement, A-pillar reinforcement, roof frame or body sill.

The method according to the invention will be described in detail below.

The method according to the invention serves to produce a steel component having a content of diffusible hydrogen $H_{diff}$ of up to 0.4 ppm, preferably 0.01 to 0.4 ppm, particularly preferably 0.05 to 0.4 ppm, for example 0.1, 0.2, 0.3, or 0.4 ppm, in the material after hot forming in each case. $H_{diff}$ describes the amount of hydrogen atoms present in dissolved form in the steel substrate after hot forming. Methods for determining the $H_{diff}$ content are known per se to a person skilled in the art, for example desorption mass spectrometry using heated samples (thermal desorption mass spectrometry (TDMS)).

Step (A) of the method according to the invention comprises providing a flat steel product having a coating containing (all data in wt. %) 3 to 15 Si, 1 to 3.5 Fe, 0.05 to 5.0 alkali and/or alkaline earth metals, remainder Al and unavoidable impurities, which has a rolling degree to sheet thickness ratio of greater than 0.8 to 200.

According to the invention, in step (A) of the method according to the invention, any flat steel product which appears suitable to a person skilled in the art and has a corresponding coating can be used. According to the invention, a flat steel product containing the following is preferably used in the method according to the invention (all data in wt. %)

0.06 to 0.50, preferably 0.18 to 0.37, particularly preferably 0.20 to 0.25 C, 0.50 to 3.0, preferably 0.80 to 2.00, particularly preferably 1.00 to 1.60 Mn, 0.10 to 0.50, preferably 0.15 to 0.40, particularly preferably 0.20 to 0.30 Si, 0.01 to 1.00, preferably 0.10 to 0.5, particularly preferably 0.10 to 0.40 Cr, up to 0.20, preferably 0.01 to 0.10, particularly preferably 0.01 to 0.05 Ti, up to 0.10, preferably 0.01 to 0.05, particularly preferably 0.02 to 0.05 Al, up to 0.10, preferably 0.00 to 0.05, particularly preferably 0.00 to 0.02 P, up to 0.1, preferably 0.001 to 0.1 Nb, up to 0.01 N, up to 0.05, preferably 0.00 to 0.005, particularly preferably 0.00 to 0.003 S and up to 0.1, preferably 0.001 to 0.05, particularly preferably 0.002 to 0.0035 B, remainder Fe and unavoidable impurities, comprising a coating containing (all data in wt. %)

3 to 15 Si, 1 to 3.5 Fe, 0.05 to 5.0, preferably 0.05 to 1.5, particularly preferably 0.11 to 0.6 alkali and/or alkaline earth metals, remainder Al and unavoidable impurities.

According to the invention, unavoidable impurities in the substrate are, for example, Cu, Mo, V, Ni and/or Sn.

The flat steel product used is preferably a strip, in particular a hot-rolled strip or a cold-rolled strip, a metal sheet, i.e. a piece of a hot-rolled strip or a cold-rolled strip, or a blank made of a hot-rolled strip or a blank made of a cold-rolled strip. The present invention preferably relates to the method according to the invention, wherein the flat steel product is a blank made of a hot-rolled strip or a blank made of a cold-rolled strip.

Methods for producing a hot-rolled strip or a cold-rolled strip are known per se to a person skilled in the art and are described, for example, in (Hoffmann, Hartmut; Neugebauer, Reimund; Spur, Gunter (2012): Handbuch Umformen [Forming Handbook]. Munich: Carl Hanser Verlag GmbH & Co. KG. Pages 109 to 165 and pages 196 to 207).

The steel substrate used according to the invention preferably has a tempered microstructure, for example at least 80% martensite, the remainder being bainite, ferrite and retained austenite.

The flat steel product produced according to the invention is provided with a coating, the coating preferably having 3 to 15, particularly preferably 7 to 12, more particularly preferably 9 to 10 Si, 1 to 3.5, preferably 2 to 3.5 Fe, 0.05 to 5.0, preferably 0.05 to 1.5, particularly preferably 0.11 to 0.6 alkali and/or alkaline earth metals, remainder Al and unavoidable impurities (all data in wt. %). In the context of the present invention, alkali and/or alkaline earth metals are preferably magnesium, calcium and/or lithium, particularly preferably magnesium.

Methods for producing a corresponding coated flat steel product are known per se to a person skilled in the art, for example the coating can be carried out by hot-dip galvanizing, by an electrolytic coating or by means of a piecework-coating process. The present invention therefore preferably relates to the method according to the invention, wherein the coating is carried out by hot-dip galvanizing, by an electrolytic coating or by means of a piecework-coating process.

Preferably, the aluminum-silicon-iron alloy is applied by means of a continuous hot-dip galvanizing process. Preferably, the temperature of the aluminum melt bath is between 660° C. and 720° C. during coating.

Silicon in the coating acts as a diffusion blocker and serves to settle the melt bath when applying the coating formed by the aluminum alloy by means of hot-dip galvanizing.

The thickness of the coating is, according to the invention, preferably 5 to 60 μm, preferably 10 to 40 μm.

This results in a claimed coating weight of the double-sided coating of from 20 to 240 g/m$^2$, preferably 40 to 200 g/m$^2$, particularly preferably 50 to 180 g/m$^2$, for example 60, 80 or 150 g/m$^2$. The present invention therefore preferably relates to the method according to the invention, wherein the coating weight of the double-sided coating is 20 to 240 g/m$^2$.

According to the invention, the coating can be present on one side of the flat steel product or on both sides of the flat steel product. The present invention therefore preferably relates to the method according to the invention, wherein the coating is present on one side of the flat steel product or on both sides of the flat steel product.

The flat steel product provided in step (A) of the method according to the invention has a rolling degree to sheet thickness ratio of 0.8 to 200, preferably greater than 0.8 to 180, particularly preferably greater than 0.8 to 150.

The flat steel product provided according to the invention preferably has a rolling degree of from 0.5 to 75%, particularly preferably from 2.5 to 60%. The rolling degree is stated in % according to the invention. In the context of the present invention, "rolling degree" means the ratio of the decrease in thickness due to rolling to the initial thickness of the flat steel product; in particular, the rolling degree is determined according to the following formula (2):

$$\text{rolling degree} = \frac{\Delta h}{h_0}, \quad (2)$$

where $\Delta h$ is equal to the decrease in thickness due to rolling, i.e. starting thickness—final thickness ($\Delta h = h_0 - h_1$)) and $h_0$ are equal to the starting thickness of the flat steel product, each in mm. In a preferred embodiment of the method according to the invention, a flat steel product is used in step (A) which has regions that are rolled to a lower sheet thickness than other regions. In this case, which is preferred according to the invention, the greatest rolling degree available is taken as the basis for the relevant component.

The dimensionless rolling degree to sheet thickness ratio (WGB) is determined according to the invention according to the following formula (3):

$$WGB = 1.5 \cdot \frac{1 + \text{rolling degree} \cdot 100}{\frac{1}{2} \cdot \left(1 + \sqrt{\text{Sheet thickness/mm}}\right)}, \quad (3)$$

where the sheet thickness is in mm and is identical to $h_1$, i.e. the final thickness of the flat steel product after rolling.

According to the invention, the flat steel products used in step (A) of the method according to the invention preferably have a sheet thickness (final thickness $h_1$) of from 0.5 to 6 mm, particularly preferably 0.8 to 3 mm.

According to the invention, after method step (B) has been carried out, the coated flat steel product from step (A) is preferably transferred directly into method step (C) according to the invention. However, it is also possible that, between steps (A) and (B) or (C), further steps are carried out, for example cutting out regions, in particular sheets or blanks of the flat steel product, for example by shearing or laser cutting, making holes by laser machining or punching, and/or previous heat treatments to change the properties of the coating or substrate.

Step (B) of the method according to the invention comprises determining a WOP value on the basis of the rolling degree to sheet thickness ratio WGB within a surface spanned by straight connecting paths between the points P11 (WGB 0.8, WOP 100) and P13 (WGB 0.8, WOP 800), P13 (WGB 0.8, WOP 800) and P21 (WGB 26, WOP 650), P21 (WGB 26, WOP 650) and P41 (WGB 74, WOP 590), P41 (WGB 74, WOP 590) and P53 (WGB 150, WOP 520), P53 (WGB 150, WOP 520) and P51 (WGB 150, WOP 100) and P51 (WGB 150, WOP 100) and P11 (WGB 0.8, WOP 100) in a coordinate system in which the WOP value is plotted on the y axis and the rolling degree to sheet thickness ratio is plotted on the x axis, as preferably shown in FIG. 1. According to the invention, a suitable WOP value range is thus determined, from which a WOP value can in turn be selected. According to the invention, however, all the WOP values lying in the specific WOP value range fulfill the condition that a steel component having a content of diffusible hydrogen of at most 0.4 ppm is obtained.

Step (B) of the method according to the invention serves to determine a WOP value on the basis of the rolling degree to sheet thickness ratio of the flat steel product used, with WOP meaning "hydrogen-related furnace parameter" and not having a unit. The WOP value then provides information about the process parameters with which the heat treatment in step (C) should take place so that steel components having a content of diffusible hydrogen of at most 0.4 ppm are obtained.

When determining the WOP value according to the present invention, a range for suitable WOP values is determined using the rolling degree to sheet thickness ratio. From this range, it is then preferably possible to select a WOP value which is then used to determine the corresponding value for $T_{furnace}$, $t_{furnace}$ and $T_{dew\ point}$ using the equation of general formula (I). In general, however, all values present in the accordingly determined range of WOP values are suitable for being substituted into the equation of general formula (I) to determine corresponding values for $T_{furnace}$, $t_{furnace}$ and $T_{dew}$ point Step (B) of the method according to the invention is preferably carried out in that the WOP value is determined graphically at a predetermined rolling degree to sheet thickness ratio (region A) within a surface spanned by straight connecting paths between the points P11 (WGB 0.8, WOP 100) and P13 (WGB 0.8, WOP 800), P13 (WGB 0.8, WOP 800) and P21 (WGB 26, WOP 650), P21 (WGB 26, WOP 650) and P41 (WGB 74, WOP 590), P41 (WGB 74, WOP 590) and P53 (WGB 150, WOP 520), P53 (WGB 150, WOP 520) and P51 (WGB 150, WOP 100) and P51 (WGB 150, WOP 100) and P11 (WGB 0.8, WOP 100) in a coordinate system in which the WOP value is plotted on the y axis and the rolling degree to sheet thickness ratio is plotted on the x axis. The corresponding graph is shown in FIG. 1; region A results from a combination of the illustrated partial surfaces "3", "4" and "5" in FIG. 1.

In a preferred embodiment of the method according to the invention, the WOP value is determined according to step (B) of the method according to the invention within a surface spanned by straight connecting lines between the points P12 (WGB 0.8, WOP 300) and P13 (WGB 0.8, WOP 800), P13 (WGB 0.8, WOP 800) and P21 (WGB 26, WOP 650), P21 (WGB 26, WOP 650) and P41 (WGB 74, WOP 590), P41 (WGB 74, WOP 590) and P53 (WGB 150, WOP 520), P53 (WGB 150, WOP 520) and P52 (WGB 150, WOP 200), P52 (WGB 150, WOP 200) and P32 (WGB 50, WOP 200), P32 (WGB 50, WOP 200) and P33 (WGB 50, WOP 300) and P33 (WGB 50, WOP 300) and P12 (WGB 0.8, WOP 300) in a coordinate system in which the WOP value is plotted on the y axis and the rolling degree to sheet thickness ratio (WGB) is plotted on the x axis (region B). The corresponding graph is shown in FIG. 1; region B is the illustrated partial surfaces "5" without the partial surfaces "3" and "4" in FIG. 1.

By using the WOP value determined in step (B) of the method according to the invention, it can then be determined according to the invention at which dew point temperature of the furnace atmosphere $T_{dew\ point}$, at which average furnace temperature $T_{furnace}$ and for which duration $t_{furnace}$ step (C) of the method according to the invention is carried out.

Step (C) of the method according to the invention comprises treating the flat steel product at an average furnace temperature $T_{furnace}$ (in K) for a duration $t_{furnace}$ (in h), wherein the dew point temperature of the furnace atmosphere $T_{dew\ point}$ (in K), the average furnace temperature $T_{furnace}$ (in K) and the duration $t_{furnace}$ (in h) are set according to the following equation of general formula (1)

$$WOP = \frac{T_{furnace}}{K} \cdot \log\left(\frac{t_{furnace}}{h} + 1.15\right) + \left(\frac{T_{dew\ point}}{K} - 243.15\right)^{1.6}, \quad (1)$$

such that the WOP value is within the interval specified by means of FIG. 1 between the minimum and maximum WOP values.

The furnace temperature $T_{furnace}$ (in K) is the temperature which, on average, prevails in the furnace in step (C) of the method according to the invention. According to the invention, $T_{furnace}$ may assume any value which a person skilled in the art considers suitable. In the method according to the invention, $T_{furnace}$ is preferably AC1 to 1373 K, preferably 1113 to 1253 K, particularly preferably 1133 to 1223 K, more particularly preferably 1153 to 1193 K. Here, AC1 means the first austenitizing temperature, which is dependent on the alloy composition.

The duration $t_{furnace}$ (in h) is the time over which said furnace temperature $T_{furnace}$ prevails in step (C). According to the invention, $t_{furnace}$ may assume any value which a person skilled in the art considers suitable. In the method according to the invention, $t_{furnace}$ in particular describes the period in which the flat steel product is moved through a continuous furnace or remains in a stationary furnace. In the method according to the invention, $t_{furnace}$ is preferably from 0.05 to 0.5 h, preferably from 0.067 to 0.25 h, particularly preferably from 0.067 to 0.4 h.

In one embodiment, furnace temperature $T_{furnace}$, duration $t_{furnace}$, and WOP value are used to calculate and then set the dew point temperature of the furnace atmosphere of the furnace $T_{dew\ point}$ by means of equation (1). The dew point temperature of the furnace $T_{dew\ point}$ (in K) is, for example, 243.15 to 333.15 K, preferably 253.15 to 303.15 K, particularly preferably 263.15 to 293.15 K.

In a further preferred embodiment, the dew point temperature of the furnace atmosphere of the furnace $T_{dew\ point}$, duration $t_{furnace}$ and WOP value are used to calculate and then set the furnace temperature $T_{furnace}$ by means of equation (1).

In a further preferred embodiment, the dew point temperature of the furnace atmosphere of the furnace $T_{dew\ point}$, furnace temperature $T_{furnace}$, and WOP value are used to calculate and then set the duration $t_{furnace}$ by means of equation (1).

Step (C) of the method according to the invention can generally be carried out in any furnace known to a person skilled in the art, for example roller hearth furnaces, chamber furnaces, multilayer chamber furnaces, or walking beam furnaces.

Step (D) of the method according to the invention comprises forming the heated flat steel product from step (C) in a mold while simultaneously cooling to obtain the steel component.

In general, in step (D) of the method according to the invention, all methods known to a person skilled in the art can be used for hot forming, for example as described in Warmumformung im Automobilbau—Verfahren, Werkstoffe, Oberflächen [Hot Forming in the Automotive Industry—Processes, Materials, Surfaces], Landsberg/Lech: Verl. Moderne Industrie, 2012, Die Bibliothek der Technik [The Library of Technology].

In step (D) of the method according to the invention, the desired steel component is obtained from the flat steel product from step (C) by forming. For the desired tempered microstructure, for example at least 80% martensite, with the remainder being bainite, ferrite and retained austenite, to be formed in the steel component, the forming takes place with simultaneous cooling. The cooling in step (C) of the method according to the invention is preferably carried out at a rate of from 27 to 1000 K/s, particularly preferably from 50 to 500 K/s. The present invention therefore preferably relates to the method according to the invention, wherein the cooling in step (D) takes place at a cooling rate of from 27 to 500 K/s.

The present invention also relates to a steel component containing (all data in wt. %)
- 0.06 to 0.50, preferably 0.18 to 0.37, particularly preferably 0.20 to 0.25 C,
- 0.50 to 3.0, preferably 0.80 to 2.00, particularly preferably 1.00 to 1.60 Mn,
- 0.10 to 0.50, preferably 0.15 to 0.40, particularly preferably 0.20 to 0.30 Si,
- 0.01 to 1.00, preferably 0.10 to 0.5, particularly preferably 0.10 to 0.40 Cr,
- up to 0.20, preferably 0.01 to 0.10, particularly preferably 0.01 to 0.05 Ti,
- up to 0.10, preferably 0.01 to 0.05, particularly preferably 0.02 to 0.05 Al,
- up to 0.10, preferably 0.00 to 0.05, particularly preferably 0.00 to 0.02 P,
- up to 0.1, preferably 0.001 to 0.1 Nb,
- up to 0.01 N,
- up to 0.05, preferably 0.00 to 0.005, particularly preferably 0.00 to 0.003 S and
- up to 0.1, preferably 0.001 to 0.05, particularly preferably 0.002 to 0.0035 B,
- remainder Fe and unavoidable impurities,
- comprising a coating containing (all data in wt. %)
- 3 to 15 Si,
- 1 to 3.5 Fe,
- 0.05 to 5.0, preferably 0.05 to 1.5, particularly preferably 0.11 to 0.6 alkali and/or alkaline earth metals, remainder Al and unavoidable impurities,
- produced using the method according to the invention. Preferably, the coating weight of the double-sided coating of the steel component according to the invention is from 20 to 240 g/m².

The steel component according to the invention preferably has a fully alloyed alloy layer between the steel substrate and the Al-based coating. The steel component according to the invention preferably has a fully alloyed alloy layer in a thickness of from 5 to 60 µm, preferably 10 to 45 µm. The thickness of the alloy layer can be measured by methods known to a person skilled in the art (e.g. according to DIN EN ISO 1463).

The details and preferred embodiments mentioned with regard to the method according to the invention apply accordingly to the steel component according to the invention.

The present invention also relates to the use of a coated steel component according to the invention in the automotive sector, in particular as a bumper support/reinforcement, door reinforcement, B-pillar reinforcement, A-pillar reinforcement, roof frame or body sill.

With regard to the individual features of the use according to the invention and of the preferred embodiments, that said with regard to the method according to the invention applies accordingly.

DRAWINGS

FIG. 1 shows a graph in which the WOP value is plotted against the rolling degree to sheet thickness ratio. On said graph, the numbering means the following:
1 WOP value (hydrogen-related furnace parameter value)
2 WGB (rolling degree to sheet thickness ratio)
3 Partial surface "3"
4 Partial surface "4"
5 Partial surface "5"

Figure 2:
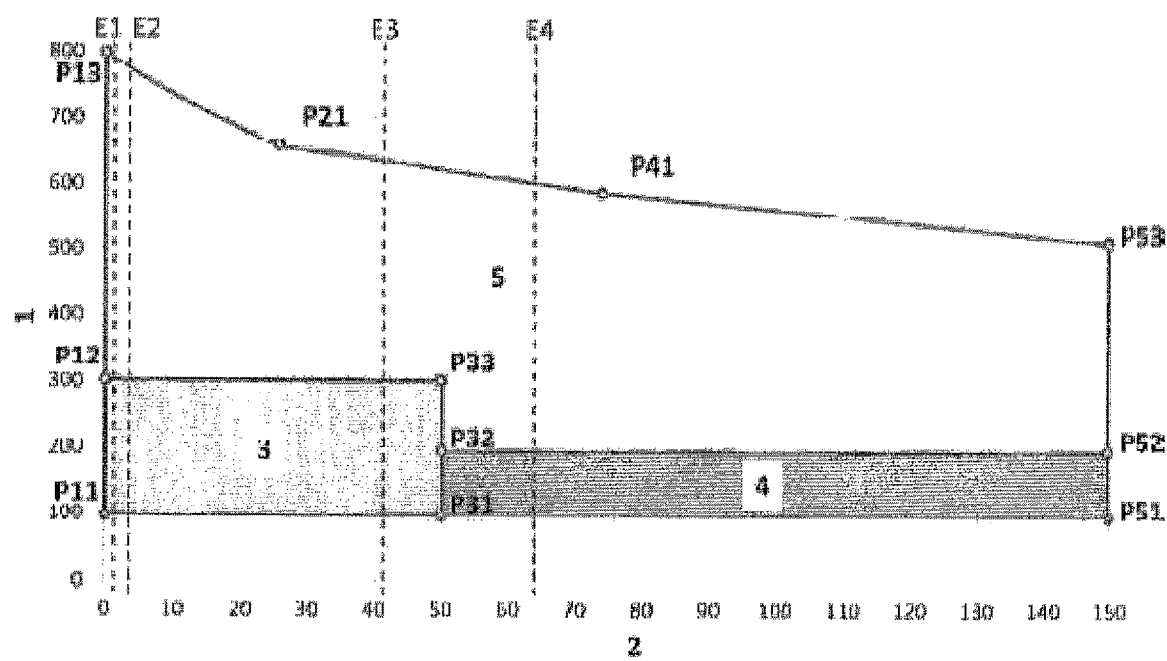

FIG. 2 shows, by way of example, how the WOP value is determined with a known rolling degree to sheet thickness ratio according to the invention, and in this case the numbering means the following:
E1 rolling degree 0.5%, starting sheet thickness 3.0 mm, rolling degree to sheet thickness ratio 1.6, resulting in WOP value of from 300 to 790.
E2 rolling degree 2.5%, starting sheet thickness 3.0 mm, rolling degree to sheet thickness ratio 3.8, resulting in WOP value of from 300 to 780.
E3 rolling degree 30%, starting sheet thickness 1.5 mm, rolling degree to sheet thickness ratio 41.8, resulting in WOP value of from 300 to 630.
E4 rolling degree 50%, starting sheet thickness 1.98 mm, rolling degree to sheet thickness ratio 63.6, or rolling degree 47%, starting sheet thickness 1.5 mm, rolling degree to sheet thickness ratio 64.7, resulting in WOP value of from 200 to 600 in each case.

EXAMPLES

Example 1

The following embodiments serve to explain the invention in greater detail.

Blanks are used which have been obtained from melts having the alloy components according to Table 1.

TABLE 1

Melt composition of the flat steel products used

| Alloy elements | Alloy component in wt. % | | | |
|---|---|---|---|---|
| | Melt A | Melt B | Melt C | Melt D |
| C | 0.224 | 0.212 | 0.219 | 0.212 to 0.225 |
| Si | 0.23 | 0.22 | 0.26 | 0.21 to 0.27 |
| Mn | 1.20 | 1.11 | 1.14 | 1.11 to 1.20 |
| P | 0.014 | 0.009 | 0.013 | 0.009 to 0.016 |
| S | 0.0029 | 0.0013 | 0.0023 | 0.0006 to 0.0029 |
| Al total | 0.035 | 0.027 | 0.032 | 0.026 to 0.038 |
| Cr | 0.190 | 0.187 | 0.183 | 0.180 to 0.190 |
| Nb | 0.001 | 0.001 | 0.001 | 0.001 to 0.001 |
| Mo | 0.0055 | 0.0018 | 0.0040 | 0.0016 to 0.0055 |
| Ti | 0.028 | 0.029 | 0.025 | 0.020 to 0.033 |
| B | 0.0022 | 0.0024 | 0.0026 | 0.0021 to 0.0028 |

All data in wt. %, remainder Fe and unavoidable impurities

The flat steel products used have a coating containing 9 to 10 wt. % Si, 2 to 3.5 wt. % iron, remainder aluminum and the amount of Mg set out in Table 2, The coating weight, the sheet thickness and the rolling degree of the flat steel products used are likewise set out in Table 2. The corresponding WOP value is then determined in the graph according to FIG. 1 by means of the rolling degree to sheet thickness ratio (formula 3), and $T_{furnace}$, $t_{furnace}$ and $T_{dew\ point}$ of the furnace atmosphere are subsequently determined and set by means of formula (1). The thus heated flat steel product is then removed from the furnace and inserted into a mold after a transport time of 6 seconds. After insertion into the mold, this mold immediately closes and remains in the closed state for approx. 20 seconds, in order to thereby cool the component to <80° C. by contact with the cooled molds. Samples are taken from the manufactured steel components, which are analyzed with regard to the amount of diffusible hydrogen contained ($H_{diff}$) by means of desorption mass spectrometry using heated samples (thermal desorption mass spectrometry (TDMS)).

TABLE 2

| Serial no. | Melt | Mg content [wt. %] | Coating weight on both sides [g/m²] | Sheet thickness [mm] | Rolling degree [%] | WGB | $T_{furnace}$ [K] | $t_{furnace}$ [h] | $T_{dew\ point}$ [K] | $H_{diff}$ [ppm] | WOP value | Region |
|---|---|---|---|---|---|---|---|---|---|---|---|---|
| V1 | A | 0.3 | 80 | 1.50 | 0 | 1.3 | 1193.15 | 0.100 | 288.15 | 0.12 | 557 | — |
| V2 | A | 0.3 | 80 | 1.50 | 0 | 1.3 | 1193.15 | 0.167 | 288.15 | 0.17 | 584 | — |
| V3 | A | 0.3 | 140 | 1.50 | 0 | 1.3 | 1193.15 | 0.222 | 288.15 | 0.13 | 606 | — |
| V4 | A | 0.3 | 140 | 1.50 | 0 | 1.3 | 1193.15 | 0.100 | 288.15 | 0.14 | 557 | — |
| V5 | A | 0 | 140 | 1.50 | 0 | 1.3 | 1193.15 | 0.222 | 288.15 | 0.45 | 606 | — |
| 6 | A | 0.3 | 140 | 1.10 | 27 | 41.0 | 1193.15 | 0.100 | 248.15 | 0.07 | 129 | A |
| 7 | A | 0.3 | 140 | 1.10 | 27 | 41.0 | 1193.15 | 0.167 | 248.15 | 0.05 | 156 | A |
| 8 | A | 0.3 | 140 | 1.10 | 27 | 41.0 | 1193.15 | 0.222 | 248.15 | 0.05 | 177 | A |
| 9 | A | 0.3 | 140 | 1.10 | 27 | 41.0 | 1193.15 | 0.100 | 268.15 | 0.26 | 288 | A |
| 10 | A | 0.3 | 140 | 1.10 | 27 | 41.0 | 1193.15 | 0.167 | 268.15 | 0.14 | 315 | B |
| 11 | A | 0.3 | 140 | 1.10 | 27 | 41.0 | 1193.15 | 0.222 | 268.15 | 0.12 | 336 | B |
| 12 | A | 0.3 | 140 | 0.80 | 47 | 76.0 | 1193.15 | 0.100 | 248.15 | 0.15 | 129 | A |
| 13 | A | 0.3 | 140 | 0.80 | 47 | 76.0 | 1193.15 | 0.167 | 248.15 | 0.13 | 156 | A |
| 14 | A | 0.3 | 140 | 0.80 | 47 | 76.0 | 1193.15 | 0.222 | 248.15 | 0.05 | 177 | A |
| 15 | A | 0.3 | 140 | 0.80 | 47 | 76.0 | 1193.15 | 0.100 | 268.15 | 0.34 | 288 | A |
| 16 | A | 0.3 | 140 | 0.80 | 47 | 76.0 | 1193.15 | 0.167 | 268.15 | 0.29 | 315 | B |
| 17 | A | 0.3 | 140 | 0.80 | 47 | 76.0 | 1193.15 | 0.222 | 268.15 | 0.22 | 336 | B |
| V18 | A | 0.3 | 140 | 0.80 | 47 | 76.0 | 1193.15 | 0.222 | 288.15 | 0.89 | 606 | — |
| V19 | C | 0 | 140 | 1.50 | 0 | 1.3 | 1193.15 | 0.083 | 288.15 | 0.47 | 550 | — |
| V20 | C | 0 | 140 | 1.50 | 0 | 1.3 | 1193.15 | 0.167 | 288.15 | 0.59 | 584 | — |
| V21 | C | 0 | 140 | 1.50 | 0 | 1.3 | 1193.15 | 0.083 | 268.15 | 0.20 | 281 | — |
| V22 | C | 0 | 140 | 1.50 | 0 | 1.3 | 1193.15 | 0.083 | 248.15 | 0.10 | 122 | — |
| 23 | B | 0.4 | 140 | 1.35 | 30 | 43.0 | 1193.15 | 0.083 | 268.15 | 0.20 | 281 | A |
| 24 | B | 0.4 | 140 | 1.35 | 30 | 43.0 | 1193.15 | 0.167 | 268.15 | 0.17 | 315 | B |

TABLE 2-continued

| Serial no. | Melt | Mg content [wt. %] | Coating weight on both sides [g/m²] | Sheet thickness [mm] | Rolling degree [%] | WGB | $T_{furnace}$ [K] | $t_{furnace}$ [h] | $T_{dew\ point}$ [K] | $H_{diff}$ [ppm] | WOP value | Region |
|---|---|---|---|---|---|---|---|---|---|---|---|---|
| 25 | B | 0.4 | 140 | 1.35 | 30 | 43.0 | 1193.15 | 0.083 | 288.15 | 0.22 | 550 | B |
| 26 | B | 0.4 | 140 | 1.35 | 30 | 43.0 | 1193.15 | 0.167 | 288.15 | 0.31 | 584 | B |
| 27 | B | 0.4 | 140 | 1.00 | 50 | 76.5 | 1193.15 | 0.083 | 268.15 | 0.11 | 281 | A |
| 28 | B | 0.4 | 140 | 1.00 | 50 | 76.5 | 1193.15 | 0.083 | 268.15 | 0.13 | 281 | A |
| 29 | B | 0.4 | 140 | 1.00 | 50 | 76.5 | 1193.15 | 0.167 | 268.15 | 0.11 | 315 | B |
| 30 | B | 0.4 | 140 | 1.00 | 50 | 76.5 | 1193.15 | 0.167 | 268.15 | 0.12 | 315 | B |
| 31 | B | 0.4 | 140 | 1.00 | 50 | 76.5 | 1193.15 | 0.083 | 288.15 | 0.26 | 550 | B |
| 32 | B | 0.4 | 140 | 1.00 | 50 | 76.5 | 1193.15 | 0.167 | 288.15 | 0.28 | 584 | B |
| V33 | D | 0.3 | 140 | 1.50 | 0 | 1.3 | 1253.15 | 0.083 | 288.15 | 0.27 | 554 | — |
| V34 | D | 0.3 | 140 | 1.50 | 0 | 1.3 | 1153.15 | 0.167 | 288.15 | 0.27 | 579 | — |
| V35 | D | 0 | 140 | 1.50 | 0 | 1.3 | 1153.15 | 0.250 | 288.15 | 0.47 | 610 | — |
| 36 | D | 0 | 140 | 1.50 | 25 | 35.1 | 1193.15 | 0.083 | 268.15 | 0.29 | 281 |  |
| V37 | D | 0 | 140 | 1.50 | 25 | 35.1 | 1193.15 | 0.050 | 288.15 | 0.52 | 536 | — |
| 38 | D | 0 | 140 | 1.50 | 25 | 35.1 | 1193.15 | 0.083 | 258.15 | 0.05 | 185 | A |
| 39 | D | 0 | 140 | 1.50 | 25 | 35.1 | 1193.15 | 0.167 | 258.15 | 0.22 | 219 | A |
| 40 | D | 0.5 | 140 | 1.00 | 0 | 1.5 | 1193.15 | 0.167 | 288.15 | 0.27 | 584 | B |
| 41 | D | 0.5 | 140 | 1.97 | 0 | 1.2 | 1193.15 | 0.083 | 288.15 | 0.10 | 550 | B |
| 42 | D | 0.5 | 140 | 1.97 | 0 | 1.2 | 1193.15 | 0.250 | 288.15 | 0.30 | 616 | B |
| V43 | D | 0 | 140 | 1.50 | 25 | 35.1 | 1193.15 | 0.083 | 288.15 | 0.85 | 550 | — |
| V44 | D | 0 | 140 | 1.50 | 25 | 35.1 | 1193.15 | 0.167 | 268.15 | 0.49 | 315 | — |
| 45 | D | 0.3 | 140 | 1.50 | 0 | 1.3 | 1193.15 | 0.083 | 298.15 | 0.24 | 718 | B |
| 46 | D | 0 | 140 | 1.30 | 30 | 43.5 | 1193.15 | 0.083 | 268.15 | 0.27 | 281 | A |
| 47 | D | 0 | 140 | 1.30 | 30 | 43.5 | 1193.15 | 0.083 | 268.15 | 0.27 | 281 | A |
| V48 | D | 0 | 140 | 1.30 | 30 | 43.5 | 1193.15 | 0.083 | 288.15 | 0.57 | 550 | — |
| V49 | D | 0 | 140 | 0.95 | 50 | 77.5 | 1193.15 | 0.083 | 268.15 | 0.58 | 281 | — |
| V50 | D | 0 | 140 | 0.95 | 50 | 77.5 | 1193.15 | 0.167 | 268.15 | 0.47 | 315 | — |

V Comparative example

Example 2

Determination by way of example of allowable values for $T_{furnace}$, $t_{furnace}$ and $T_{dew\ point}$ to maintain an $H_{diff}$ value of 0.4 ppm in produced components made of flat steel products.

Example E3 from FIG. 2

$h_0$=2.143 mm; $h_1$=sheet thickness=1.5 mm; $\Delta h$=0.643 mm; coating with Mg 0.35 wt. %

$$\text{rolling degree} = \frac{\Delta h}{h_0} = \frac{0.643\ \text{mm}}{2.143\ \text{mm}} = 0.3 = 30\%$$

$$WGB = 1.5 \cdot \frac{1 + \text{rolling degree} \cdot 100}{\frac{1}{2}\left(1 + \sqrt{\text{Sheet}\frac{\text{thickness}}{\text{mm}}}\right)} = 1.5 \cdot \frac{1 + 0.3 \cdot 100}{\frac{1}{2}\left(1 + \sqrt{\frac{1.5\ \text{mm}}{\text{mm}}}\right)} = 41.8$$

For the WGB value of 41.8, a WOP value of from 300 to 630 can be read out from FIG. 1 or calculated using the specified points. Now the three parameters $T_{furnace}$, $t_{furnace}$ and $T_{dew\ point}$ can be set to result in a WOP value of: 300≤WOP≤630, for example: $T_{furnace}$=930° C.=1203.15 K; $t_{furnace}$=400 s=0.111 h; and $T_{dew\ point}$=10° C.=283.15 K $$300 \leq WOP \leq 630$$

$$\Leftrightarrow 300 \leq \frac{T_{furnace}}{K} \cdot \log\left(\frac{t_{furnace}}{h} + 1.15\right) + \left(\frac{T_{dew\ point}}{K} - 243.15\right)^{1.6} \leq 630$$

$$\Leftrightarrow 300 \leq \frac{1203.15K}{K} \cdot \log\left(\frac{0.111\ h}{h} + 1.15\right) + \left(\frac{283.15K}{K} - 243.15\right)^{1.6} \leq 630$$

$$\Leftrightarrow 300 \leq 487 \leq 630$$

$$\Leftrightarrow \text{true statement}$$

Since the calculated WOP value of 487 is between 300 and 630, the selected parameters allow a maximum $H_{diff}$ value of 0.4 ppm to be maintained in the component.

INDUSTRIAL APPLICABILITY

The steel component produced according to the invention has a low tendency toward hydrogen-induced fractures under load stresses and can therefore advantageously be used in the automotive sector, aircraft construction or rail vehicle construction.

The invention claimed is:

1. A hot-formed and press hardened steel component comprising:
   a steel substrate coated with a coating;
   a rolling degree of from 2.5% to 60%, the rolling degree being a ratio of a decrease in thickness of the steel component due to rolling the steel substrate with the coating, to an initial thickness of the steel component before rolling the steel substrate with the coating;
   a content of diffusible hydrogen Hdiff of up to 0.4 ppm;
   the steel substrate includes, by weight percentage (wt. %):
   0.06 to 0.50 C,
   0.50 to 3.0 Mn,
   0.10 to 0.50 Si,
   0.01 to 1.00 Cr,
   up to 0.20 Ti,
   up to 0.10 Al,
   up to 0.10 P,
   up to 0.1 Nb,
   up to 0.01 N,
   up to 0.05 S,
   up to 0.1 B, and
   remainder Fe and unavoidable impurities, wherein Ni is not present in the steel substrate or is present in the steel substrate as an unavoidable impurity; and the coating includes, by wt. %:
3 to 15 Si,
1 to 3.5 Fe,
0.05 to 5.0 alkali and/or alkaline earth metals, and
remainder Al and unavoidable impurities.

2. The steel component according to claim 1, wherein the steel component does not have a uniform thickness.

3. The steel component according to claim 2, wherein different regions of the steel component have different rolling degrees.

4. The steel component according to claim 3, wherein a first region of the steel component has a lower rolling degree than a second region of the steel component.

5. The steel component according to claim 1, wherein the content of diffusible hydrogen Hdiff is up to 0.3 ppm.

6. The steel component according to claim 1, wherein the content of diffusible hydrogen Hdiff is up to 0.1 ppm.

7. The steel component according to claim 1, further comprising a fully alloyed alloy layer in a thickness of from 5 μm to 60 μm arranged between the steel substrate and the coating.

8. The steel component according to claim 7, wherein the thickness of the fully alloyed alloy layer is from 10 μm to 45 μm.

9. The steel component according to claim 1, wherein the coating is a hot-dip coating.

10. The steel component according to claim 1, wherein the steel substrate is a hot rolled steel substrate or a cold rolled steel substrate.

11. The steel component according to claim 1, wherein:
the steel substrate has a rolling degree to sheet thickness ratio (WGB) of greater than 0.8 to 200;
the WGB is a dimensionless value being determined according to the following formula:

$$WGB = 1.5 \cdot \frac{1 + \text{rolling degree} \cdot 100}{\frac{1}{2} \cdot (1 + \sqrt{\text{Sheet thickness}})}$$

in said formula, the sheet thickness is in mm and is a final thickness of the steel substrate after rolling.

12. A bumper support/reinforcement, door reinforcement, B-pillar reinforcement, A-pillar reinforcement, roof frame, or body sill comprising the steel component according to claim 1.

13. The steel component according to claim 1, wherein the steel substrate includes, by wt. %:
0.06 to 0.50 C,
0.50 to 3.0 Mn,
0.10 to 0.50 Si,
0.01 to 1.00 Cr,
up to 0.20 Ti,
0.01 to 0.05 Al,
0.00 to 0.05 P,
0.001 to 0.1 Nb,
up to 0.01 N,
0.00 to 0.005 S,
0.001 to 0.05 B, and
remainder Fe and unavoidable impurities.

14. The steel component according to claim 1, wherein the steel substrate includes, by wt. %:
0.06 to 0.50 C,
0.50 to 3.0 Mn,
0.10 to 0.50 Si,
0.01 to 1.00 Cr,
up to 0.20 Ti,
0.02 to 0.05 Al,
0.00 to 0.02 P,
0.001 to 0.1 Nb,
up to 0.01 N,
0.00 to 0.003 S,
0.002 to 0.0035 B, and
remainder Fe and unavoidable impurities.

15. The steel component according to claim 1, wherein the steel substrate includes, in wt. %:
0.20 to 0.25 C,
0.50 to 3.0 Mn,
0.10 to 0.50 Si,
0.01 to 1.00 Cr,
up to 0.20 Ti,
up to 0.10 Al,
up to 0.10 P,
up to 0.1 Nb,
up to 0.01 N,
up to 0.05 S,
up to 0.1 B, and
remainder Fe and unavoidable impurities.

16. The steel component according to claim 1, wherein the steel substrate includes, in wt. %:
0.20 to 0.225 C,
0.50 to 3.0 Mn,
0.10 to 0.50 Si,
0.01 to 1.00 Cr,
up to 0.20 Ti,
up to 0.10 Al,
up to 0.10 P,
up to 0.1 Nb,
up to 0.01 N,
up to 0.05 S,
up to 0.1 B, and
remainder Fe and unavoidable impurities.

17. The steel component according to claim 1, wherein the coating includes, by wt. %:
9 to 10 Si,
2 to 3.5 Fe,
0.11 to 0.6 alkali and/or alkaline earth metals, and
remainder Al and unavoidable impurities.

* * * * *